(12) United States Patent
Murphy et al.

(10) Patent No.: US 12,704,475 B2
(45) Date of Patent: Aug. 11, 2026

(54) BIOSIGNAL SENSING ELECTRODE

(71) Applicants: Murata Manufacturing Co., Ltd., Nagaokakyo (JP); The Trustees of the University of Pennsylvania, Philadelphia, PA (US)

(72) Inventors: Brendan Boyce Murphy, Nagaokakyo (JP); Nicolette Driscoll, Ambler, PA (US); Flavia Vitale, Wilmington, DE (US); Kosuke Sugiura, Nagaokakyo (JP); Mika Fujiwaki, Nagaokakyo (JP); Takeshi Torita, Nagaokakyo (JP)

(73) Assignees: MURATA MANUFACTURING CO., LTD., Nagaokakyo (JP); THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 140 days.

(21) Appl. No.: 18/435,310

(22) Filed: Feb. 7, 2024

(65) Prior Publication Data

US 2024/0175841 A1 May 30, 2024

Related U.S. Application Data

(63) Continuation of application No. PCT/JP2022/028379, filed on Jul. 21, 2022.

(Continued)

(51) Int. Cl.
*G01N 27/327* (2006.01)

(52) U.S. Cl.
CPC .................................. *G01N 27/327* (2013.01)

(58) Field of Classification Search
None
See application file for complete search history.

(56) References Cited

U.S. PATENT DOCUMENTS

2008/0283751 A1* 11/2008 Kymissis .................. G01J 5/35 250/338.3

FOREIGN PATENT DOCUMENTS

CN 108384448 B 8/2018
CN 110631743 A 12/2019

(Continued)

OTHER PUBLICATIONS

Driscoll et al., "Two-Dimensional Ti3C2 MXene for High-Resolution Neural Interfaces," ACS Nano, 2018, vol. 12, pp. 10419-10429.

(Continued)

*Primary Examiner* — J. Christopher Ball
(74) *Attorney, Agent, or Firm* — ArentFox Schiff LLP

(57) ABSTRACT

A biosignal sensing electrode, including: a substrate; a conductive film on the substrate, the conductive film containing particles of a layered material containing one or plural layers, the one or plural layers being oriented parallel to a surface of the substrate and containing a layer body represented by: $M_mX_n$, with a modifier or terminal T existing on a surface of the layer body; and a protective material containing a polymer having C═O and at least one of OH and NH as a functional group covering at least an edge of the conductive film, the functional group being bonded to the particles of the layered material, and at least a part of the second face of the conductive film is exposed from the protective material.

14 Claims, 4 Drawing Sheets

Related U.S. Application Data

(60) Provisional application No. 63/231,850, filed on Aug. 11, 2021.

(56) References Cited

FOREIGN PATENT DOCUMENTS

| | | | | |
|---|---|---|---|---|
| CN | 112038601 A | 12/2020 | | |
| WO | 2019055784 A1 | 3/2019 | | |
| WO | 2020086548 A1 | 4/2020 | | |
| WO | WO-2020170054 A1 * | 8/2020 | ........... | G01N 27/403 |
| WO | 2021072320 A1 | 4/2021 | | |

OTHER PUBLICATIONS

Guo et al., "A binder-free electrode based on Ti3C2Tx—rGO aerogel for supercapacitors," Colloids and Surfaces A: Physicochemical and Engineering Aspects, Jun. 20, 2020, vol. 595, pp. 1-6, [https://www.sciencedirect.com/science/article/pii/S0927775720302764?via%3Dihub].

Han et al., "Oxidized titanium carbide MXene-enabled photoelectrochemical sensor for quantifying synergistic interaction of ascorbic acid based antioxidants system," Biosensors and Bioelectronics, Apr. 1, 2021, vol. 177, pp. 1-6, [https://www.sciencedirect.com/science /article/pii/S0956566321000142?via%3Dihub].

International Search Report in PCT/JP2022/028379, mailed Sep. 6, 2022, 3 pages.

Natu et al., "Edge Capping of 2D-MXene Sheets with Polyanionic Salts to Mitigate Oxidation in Aqueous Colloidal Suspensions," Department of Materials Engineering, 2019, Drexel University, Philadelphia, PA, USA, pp. 1-18.

Saleh et al., "Inkjet-printed Ti3C2Tx MXene electrodes for multimodal cutaneous biosensing," Journal of Physics: Materials, 2020, vol. 3, pp. 1-14.

Wu et al., "Excellent oxidation resistive MXene aqueous ink for micro-supercapacitor application," Energy Storage Materials, 2020, vol. 25, pp. 563-571.

Xia et al., "Ambient oxidation of Ti3C2 MXene initialized by atomic defects," Nanoscale, 2019, pp. 1-8.

* cited by examiner

17
A
13
15
11
20

Fig. 3(a)
Fig. 3(b)
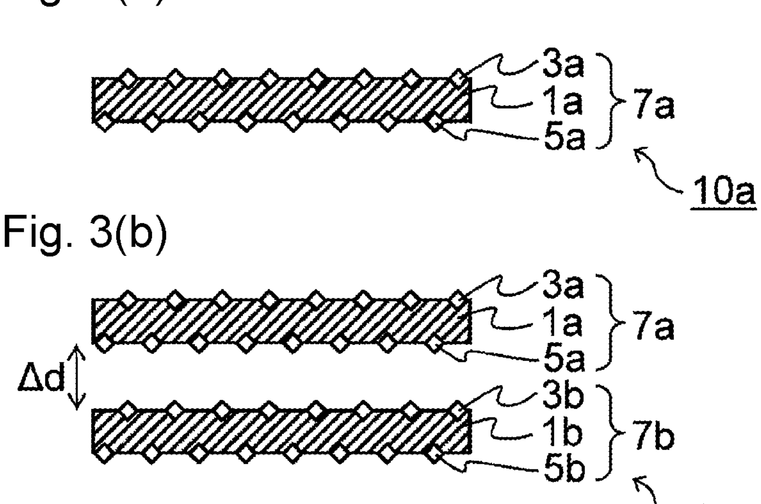
Fig. 4
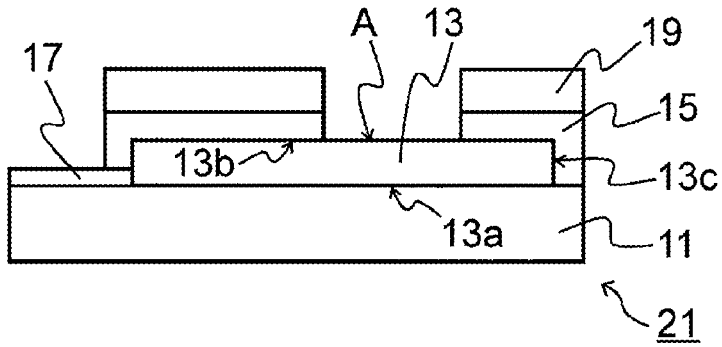
Fig. 5
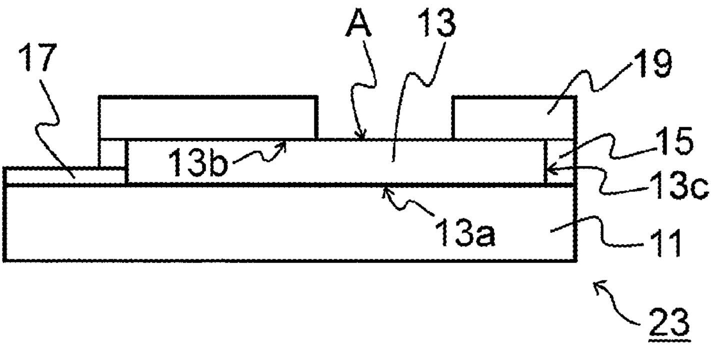

BIOSIGNAL SENSING ELECTRODE

CROSS REFERENCE TO RELATED APPLICATIONS

The present application is a continuation of International application No. PCT/JP2022/028379, filed Jul. 21, 2022, which claims priority to U.S. Provisional Patent Application No. 63/231,850, filed Aug. 11, 2021, the entire contents of each of which are incorporated herein by reference.

TECHNICAL FIELD

The present invention relates to a biosignal sensing electrode.

BACKGROUND ART

In recent years, MXene has been attracting attention as a new material having conductivity. MXene is a type of so-called two-dimensional material, and as will be described later, is a layered material in the form of one or plural layers. In general, MXene is in the form of particles (which can include powders, flakes, nanosheets, and the like) of such a layered material.

Currently, various studies are being conducted toward the application of MXene to various electric devices. It has been reported that MXene exhibits high sensitivity when used as a biosignal sensing electrode such as an electroencephalographic sensor, a myoelectric sensor, or an electrocardiographic sensor in the form of a conductive film (dry film) (refer to Non Patent Literature 1).

Non Patent Literature 1: Nicolette Driscoll, et al., "Two-Dimensional Ti3C2MXene for High Resolution Neural Interfaces", ACS Nano, 2018, Vol. 12, Issue 10, pp. 10419-10429

Non Patent Literature 2: Fanjie Xia, et al., "Ambient oxidation of Ti3C2MXene initialized by atomic defects", Nanoscale, 2019, Vol. 11, Issue 48, pp. 23330-23337

Non Patent Literature 3: Chien-Wei Wu, et al., "Excellent oxidation resistant MXene aqueous ink for micro-supercapacitor application", Energy Storage Materials, 2020, Vol. 25, pp. 563-571

Non Patent Literature 4: Varun Natu et al., "Edge Capping of 2D-MXene Sheets with Polyanionic Salts to Mitigate Oxidation in Aqueous Colloidal Suspensions", Angewandte Chemie International Edition, 2019, Volume 58, Issue 36, pp. 12655-12660

SUMMARY OF THE INVENTION

It has been reported that MXene is easily oxidized particularly in a solvent containing water (refer to Non Patent Literature 2). It has been known that MXene is oxidized over time in air (usually contains water and oxygen).

Therefore, when MXene is used as a biosignal sensing electrode in the form of a conductive film (dry film), MXene in the conductive film is oxidized over time due to contact with sweat, blood, or the like (usually contains water) derived from a living body or the like that may be a subject, or exposure to air, and as a result, the sensing capability of the conductive film deteriorates over time.

In the related art, as a method for preventing oxidation of MXene, a method for mixing an aqueous dispersion of MXene particles with an aqueous solution of sodium ascorbate (refer to Non Patent Literature 3) and a method for adding a polyanion salt (specifically, a salt of polyphosphoric acid, polysilicic acid, or polyboric acid) to an aqueous colloidal suspension of MXene (refer to Non Patent Literature 4) have been proposed. However, these methods are methods for preventing oxidation of MXene in a case where the MXene particles form an aqueous dispersion/suspension, and do not directly deal with a case where the MXene particles form a conductive film (dry film). In order to form a conductive film using the MXene particles anti-oxidation-treated by these methods, an additional step of separating the MXene particles from a liquid phase to form a film is required.

An object of the present invention is to provide a biosignal sensing electrode including a conductive film containing particles of MXene, in which deterioration of sensing capability over time is effectively reduced.

According to one aspect of the present invention, there is provided a biosignal sensing electrode, including:

a substrate;

a conductive film on the substrate and having a first face on a side thereof facing the substrate and a second face on a side thereof opposite to the substrate, wherein the conductive film contains particles of a layered material containing one or plural layers, the one or plural layers being oriented parallel to a surface of the substrate and containing a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T existing on a surface of the layer body, wherein T is at least one selected from the group consisting of a hydroxyl group, a fluorine atom, a chlorine atom, an oxygen atom, and a hydrogen atom; and a protective material containing a polymer having C═O and at least one of OH and NH as a functional group covering at least an edge of the conductive film, the functional group being bonded to the particles of the layered material, and at least a part of the second face of the conductive film is exposed from the protective material.

In one aspect of the present invention, the polymer may penetrate into the conductive film.

In one aspect of the present invention, the polymer may include at least one selected from the group consisting of polyvinyl alcohol, a polyisocyanate-crosslinked acrylic resin, an epoxy-crosslinked acrylic resin, and polyamide-imide.

In one aspect of the present invention, the protective material may further cover an outer surrounding area of the second face of the conductive film.

In one aspect of the present invention, the biosignal sensing electrode may further include a cover which is located on the second face of the conductive film, wherein a part of the second face is exposed from the cover.

In one aspect of the present invention, the $M_mX_n$ may be expressed by at least one selected from the group consisting of $Ti_2C$, $Ti_3C_2$, $Ti_3(CN)$, $(Cr_2Ti)C_2$, $(Mo_2Ti)C_2$, $(Mo_2Ti_2)C_3$, and $(Mo_{2.7}V_{1.3})C_3$.

According to the present invention, in a biosignal sensing electrode including a conductive film containing particles of a predetermined layered material (also referred to as "MXene" in the present specification), at least an edge of the conductive film is covered with a protective material containing a polymer having C═O and at least one of OH and NH as functional groups, and the functional groups are bonded to the MXene particles, thereby providing a biosignal sensing electrode in which deterioration of sensing capability over time is effectively reduced.

BRIEF DESCRIPTION OF THE DRAWINGS

FIGS. 3(*a*) and 3(*b*) are schematic cross-sectional views illustrating MXene particles which are layered materials usable for a conductive film in one embodiment of the present invention, in which FIG. 3(*a*) illustrates single-layered MXene particles, and FIG. 3(*b*) illustrates multi-layered (exemplarily two-layered) MXene particles.

FIG. 4 is a schematic cross-sectional view illustrating one modification example of the biosignal sensing electrode of FIGS. 1(*a*) and 1(*b*).

FIG. 5 is a schematic cross-sectional view illustrating another modification example of the biosignal sensing electrode of FIGS. 1(*a*) and 1(*b*).

DETAILED DESCRIPTION OF THE PREFERRED EMBODIMENTS

Hereinafter, a biosignal sensing electrode and a method for manufacturing the same according to one embodiment of the present invention will be described in detail.

Figures 1A, 1B:
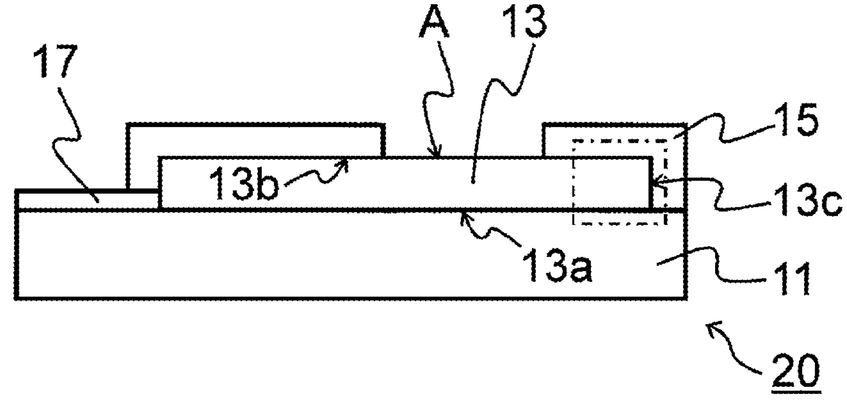
FIGS. 1(*a*) and 1(*b*) are diagrams for explaining a biosignal sensing electrode according to one embodiment of the present invention, in which FIG. 1(*a*) illustrates a schematic cross-sectional view of a biosignal sensing electrode, and FIG. 1(*b*) illustrates a schematic top view of FIG. 1(*a*).

Referring to FIGS. 1(*a*) to 1(*b*), a biosignal sensing electrode 20 of the present embodiment includes a substrate 11 and a conductive film 13 located on the substrate 11. The conductive film 13 includes a first face 13*a* on the substrate 11 side thereof and a second face 13*b* on the side thereof opposite to the substrate 11. The first face 13*a* and the second face 13*b* face each other, and may be, for example, faces parallel to each other. The conductive film 13 further includes an edge 13*c*. The edge 13*c* of the conductive film 13 is a surface (end face) connecting the first face 13*a* and the second face 13*b*. As described later, a protective material 15 covers at least edge 13*c* of the conductive film 13. At least a part of the second face 13*b* of the conductive film 13 is exposed from the protective material 15, and in the illustrated aspect, a region A (hereinafter, referred to as a "sensing region") of the second face 13*b* is exposed from the protective material 15. In the illustrated aspect, the conductive film 13 may be connected with a lead 17 at any suitable portion thereof, but this is not essential if at least a surface 11*a* of the substrate 11 is conductive. When the biosignal sensing electrode 20 includes the lead 17, a length of the lead 17 is optional, and a pad (not shown) for connecting to another electric circuit element may be formed on the side of the lead 17 opposite to the conductive film 13 side.

The substrate 11 may or may not be conductive. In addition, a size, a shape, and the like of the substrate 11 can vary depending on the application of the biosignal sensing electrode 20, and may be either flexible or rigid. The substrate 11 may be formed of any suitable material, such as a polymer, metal, a semiconductor, ceramics, and the like. The substrate 11 may be formed of one material or two or more materials. For example, the material may be a polymer, a semiconductor, ceramics, or the like having a metal layer on the surface 11*a*. In the present embodiment, a flexible substrate made of a polymer such as polyimide is used as the substrate 11.

Figure 2A:
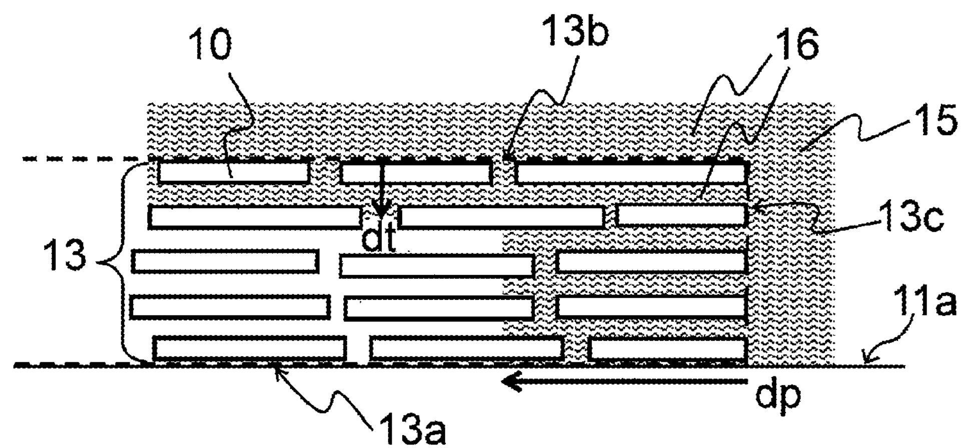
FIGS. 2(*a*) to 2(*c*) are diagrams for explaining a biosignal sensing electrode according to one embodiment of the present invention, in which FIG. 2(*a*) illustrates a schematic enlarged cross-sectional view of a region surrounded by an alternate long and short dash line in FIG. 1(*a*), FIG. 2(*b*) illustrates a schematic cross-sectional view of MXene particles and a polymer (derived from a protective material) in a conductive film, and FIG. 2(*c*) illustrates a schematic perspective view of MXene particles in a conductive film.
Figure 2B:
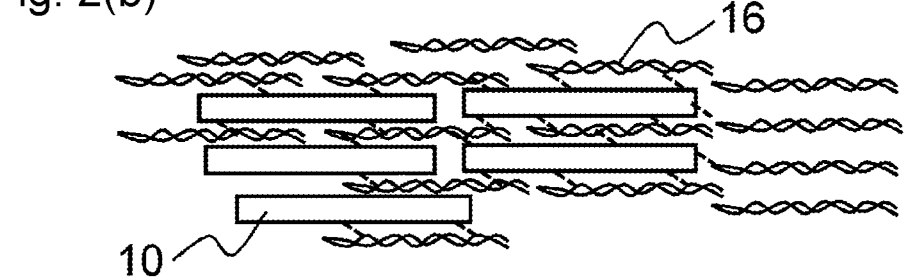
Figure 2C:
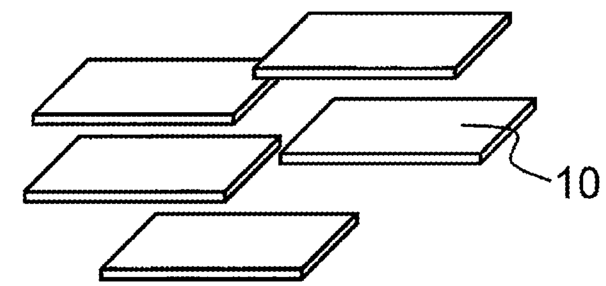

Referring to FIGS. 2(*a*) to 2(*c*), the conductive film 13 includes particles 10 of a predetermined layered material. The predetermined layered material is MXene and is defined as:

A layered material (this can be understood as a layered compound, also represented as "$M_mX_nT_s$", where s is any number and traditionally x is sometimes used instead of s) containing one or plural layers, the one or plural layers including a layer body (the layer body may have a crystal lattice in which each X is located in an octahedral array of M) represented by a formula below:

$$M_mX_n$$

- wherein M is at least one metal of Group 3, 4, 5, 6, or 7 and may contain at least one selected from the group consisting of so-called early transition metals such as Sc, Ti, Zr, Hf, V, Nb, Ta, Cr, Mo, and Mn,
- X is a carbon atom, a nitrogen atom, or a combination thereof,
- n is not less than 1 and not more than 4, and
- m is more than n but not more than 5, and a modifier or terminal T (T is at least one selected from the group consisting of a hydroxyl group, a fluorine atom, a chlorine atom, an oxygen atom, and a hydrogen atom) present on the surface (more specifically, at least one of the two opposing surfaces of the layered body) of the layered body. Typically, n may be, but is not limited to, 1, 2, 3, or 4.

In the above formula of MXene, M is preferably at least one selected from the group consisting of Ti, Zr, Hf, V, Nb, Ta, Cr, Mo, and Mn, and more preferably at least one selected from the group consisting of Ti, V, Cr, and Mo.

MXene is known that the above formula: $M_mX_n$ is expressed as follows.

- $SC_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti, V)_2C$, $(Ti, Nb)_2C$, $W_2C$, $W_{1.3}C$, $Mo_2N$, $Nb_{1.3}C$, $Mo_{1.3}Y_{0.6}C$ (in the above formula, "1.3" and "0.6" mean about 1.3 (=4/3) and about 0.6 (=2/3), respectively.),
- $Ti_3C_2$, $Ti_3N_2$, $Ti_3(CN)$, $Zr_3C_2$, $(Ti, V)_3C_2$, $(Ti_2Nb)C_2$, $(Ti_2Ta)C_2$, $(Ti_2Mn)C_2$, $Hf_3C_2$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$,
- $Ti_4N_3$, $V_4C_3$, $Nb_4C_3$, $Ta_4C_3$, $(Ti, Nb)_4C_3$, $(Nb, Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Taz)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)C_3$, $(Mo_{2.7}V_{1.3})C_3$ (in the above formula, "2.7" and "1.3" mean about 2.7 (=8/3) and about 1.3 (=4/3), respectively.)

Typically, the $M_mX_n$ is at least one selected from the group consisting of $Ti_2C$, $Ti_3C_2$, $Ti_3$ (CN), $(Cr_2Ti)C_2$, $(Mo_2Ti)C_2$, $(Mo_2Ti_2)C_3$, and $(MO_{2.7}V_{1.3})C_3$.

Such MXene particles (hereinafter, the particles are simply referred to as "MXene particles") 10 can be synthesized by selectively etching (removing and optionally layer-separating) A atoms (and optionally a part of M atoms) from a MAX phase. The MAX phase is represented by the following formula:

$$M_mAX_n$$

wherein M, X, n, and m are as described above, and A is at least one element of Group 12, 13, 14, 15, or 16, is usually a Group A element, typically Group IIIA and Group IVA, more specifically, may include at least one selected from the group consisting of Al, Ga, In, Tl, Si, Ge, Sn, Pb, P, As, S, and Cd, and is preferably Al, and has a crystal structure in which a layer formed of A atoms is located between two layers (each X may have a crystal lattice located within an octahedral array of M) represented by $M_mX_n$. Typically, in the case of m=n+1, the MAX phase has a repeating unit in which one layer of X atoms is disposed between the layers of M atoms of n+1 layers (these layers are also collectively referred to as "$M_mX_n$ layer"), and a layer of A atoms ("A atom layer") is disposed as a next layer of the (n+1) th layer of M atoms; however, the present invention is not limited thereto. By selectively etching (removing and optionally layer-separating) the A atoms (and optionally a part of the M atoms) from the MAX phase, the A atom layer (and optionally a part of the M atoms) is removed, and a hydroxyl group, a fluorine atom, a chlorine atom, an oxygen atom, a hydrogen atom, and the like existing in an etching liquid (usually, but not limited to, an aqueous solution of a fluorine-containing acid is used) are modified on the exposed surface of the $M_mX_n$ layer, thereby terminating the surface.

In the etching, an etching treatment is performed with an acid such as HF, HCl, HBr, HI, sulfuric acid, phosphoric acid, or nitric acid using a fluororesin container. For example, a method using a mixed solution of lithium fluoride and hydrochloric acid, a method using hydrofluoric acid, or the like may be used. In the etching treatment, stirring is performed at a temperature of room temperature or higher and 40 degrees or lower for about not less than 5 hours and not more than 48 hours. Next, as a washing step, an operation of transferring a liquid after the etching treatment to, for example, a centrifuge tube, adding pure water thereto, stirring the mixture, separating a supernatant and a precipitate with a centrifugal separator, and discarding the supernatant may be repeated not less than 5 times and not more than 20 times.

Thereafter, the layer separation (delamination, separating multilayer MXene into single-layer MXene) of MXene may be promoted by any appropriate post-treatment (for example, ultrasonic treatment, handshaking, automatic shaker, or the like) as appropriate. For example, the delamination treatment can be performed for a predetermined time using a mechanical shaker, a vortex mixer, a homogenizer, an ultrasonic bath, or the like. Subsequently, the supernatant and the precipitate are separated by a centrifugal separator, and the recovered supernatant can be obtained as a dispersion of MXene particles in a monolayer form.

In the present invention, MXene may contain a relatively small amount of remaining A atoms, for example, 10% by mass or less with respect to the original A atoms. The residual amount of A atoms may be preferably 8% by mass or less, and more preferably 6% by mass or less. However, even if the residual amount of A atoms exceeds 10% by mass, there may be no problem depending on the application and use conditions of the conductive film (and the biosignal sensing electrode including the conductive film).

As schematically illustrated in FIGS. 3(*a*) and 3(*b*), the MXene particles 10 synthesized in this manner may be particles of a layered material (as examples of the MXene particles 10, the MXene particles 10*a* in one layer are illustrated in FIG. 3(*a*), and the MXene particles 10*b* in two layers are illustrated in FIG. 3(*b*), but the present invention is not limited to these examples) including one or plural MXene layers 7*a* and 7*b*. More specifically, the MXene layers 7*a* and 7*b* have layer bodies ($M_mX_n$ layers) 1*a* and 1*b* represented by $M_mX_n$, and modifier or terminals T 3*a*, 5*a*, 3*b*, and 5*b* existing on the surfaces (more specifically, at least one of two surfaces facing each other in each layer) of the layer bodies 1*a* and 1*b*. Therefore, the MXene layers 7*a* and 7*b* are also represented as "$M_mX_nT_s$", and s is an optional number. The MXene particles 10 may be one in which such MXene layers are individually separated and exist in one layer (the single-layer structure illustrated in FIG. 3(*a*), so-called single layer MXene particles 10*a*), a laminate in which a plurality of MXene layers are stacked apart from each other (the multilayer structure illustrated in FIG. 3(*b*), so-called multilayer MXene particles 10*b*), or a mixture thereof. The MXene particles 10 may be particles (which may also be referred to as powders or flakes) as an aggregate formed of the single-layer MXene particles 10*a* and/or the multilayer MXene particles 10*b*. In the case of multilayer MXene particles, two adjacent MXene layers (for example, 7*a* and 7*b*) do not necessarily have to be completely separated from each other, and may be partially in contact with each other.

Although the present embodiment is not limited, the thickness of each layer of MXene (which corresponds to the MXene layers 7*a* and 7*b*) is, for example, not less than 0.8 nm and not more than 5 nm, and particularly not less than 0.8 nm and not more than 3 nm (which may mainly vary depending on the number of M atom layers included in each layer), and the maximum dimension (which may correspond to the "in-plane dimension" of the particle) in a plane parallel to the layer (two-dimensional sheet plane) is, for example, not less than 0.1 μm, particularly not less than 1 μm, for example, not more than 200 μm, and particularly not more than 40 μm.

When the MXene particles are laminate (multilayer MXene) particles, for each laminate, an interlayer distance (alternatively, a void dimension, indicated by Δd in FIG. 3(*b*)) is, for example, not less than 0.8 nm and not more than 10 nm, particularly not less than 0.8 nm and not more than 5 nm, and more particularly about 1 nm, and the maximum dimension (which may correspond to the "in-plane dimension" of the particles) in a plane (two-dimensional sheet plane) perpendicular to the lamination direction is, for example, not less than 0.1 μm, particularly not less than 1 μm, for example, not more than 100 μm, and particularly not more than 20 μm.

The total number of layers in the MXene particles may be 1 or not less than 2, but is, for example, not less than 1 and not more than 20, and the thickness in the lamination direction (which may correspond to the "thickness" of the particles) is, for example, not less than 0.8 nm and not more than 20 nm.

When the MXene particles are laminate (multilayer MXene) particles, the MXene particles may have a small number of layers. The term "the number of layers is small" means that, for example, the number of stacked layers of MXene is six or less. In addition, the thickness of the multilayer MXene having a small number of layers in the lamination direction may be less than 10 nm. In the present specification, the "multilayer MXene having a small number of layers" is also referred to as a "few-layer MXene".

Although the present embodiment is not limited, the MXene particles may be particles (also referred to as nanosheets) in which most of the MXene particles are formed of single-layer MXene and/or few-layer MXene. In the present specification, the single-layer MXene and the few-layer MXene may be collectively referred to as "single-layer/few-layer MXene".

Note that these dimensions described above may be obtained as a number average dimension (for example, a number average of at least 40) based on a photograph of a scanning electron microscope (SEM), a transmission electron microscope (TEM), or an atomic force microscope (AFM) or a distance in a real space calculated from a position on a reciprocal lattice space of a (002) plane measured by an X-ray diffraction (XRD) method.

Referring again to FIG. 2(*a*), the layer of MXene particles 10 is oriented parallel to the surface 11*a* of the substrate 11. The fact that the layer of MXene particles 10 is oriented parallel to the surface 11*a* of the substrate 11 means that most of the MXene particles 10, for example, not less than 80%, particularly not less than 90%, of the entire MXene particles 10 form an angle within +10° with respect to the surface 11*a* of the substrate 11 in the two-dimensional plane (sheet plane) of the layer of MXene particles 10.

The surface 11*a* of the substrate 11 is a face in contact with the first face 13*a* of the conductive film 13. The conductive film 13 in which the layers of the MXene particles 10 are oriented in parallel to the surface 11*a* of the substrate 11 may be manufactured by any appropriate method. Although the present embodiment is not limited, for example, by preparing a slurry in which the MXene particles synthesized as described above are dispersed and/or suspended in an appropriate solvent, spraying the slurry onto the surface 11*a* of the substrate 11, and drying and removing the solvent (at least partially, preferably substantially entirely), the conductive film 13 can be formed on the substrate 11. The drying can occur naturally while being supplied onto the substrate 11 and/or be performed subsequently. By such spraying and drying, the MXene particles 10 are deposited in a state where the layer of the MXene particles 10 is oriented in parallel to the surface 11*a* of the substrate 11. The conductive film 13 thus obtained can be binderless.

The spraying and drying may be appropriately repeated until a desired film thickness is obtained. For example, a combination of spraying and drying may be repeated a plurality of times. However, when a slurry containing the MXene particles 10 at a relatively high concentration is used, a relatively thick film (for example, a thickness of 0.5 μm or more) can be obtained only by performing one spray (and optionally drying), and the number of sprays (and optionally drying) performed until a desired film thickness is obtained can be reduced.

The thickness of the conductive film 13 is not particularly limited, but may be, for example, not less than 200 nm and not more than 20 μm. When the thickness of the conductive film 13 is 200 nm or more, continuity of the film is maintained, and sensing can be stably performed. When the thickness of the conductive film 13 is 20 μm or less, the flexibility of the substrate is not impaired, and stress concentration due to bending is small, so that sensing can be stably performed. Preferably, the thickness of the conductive film 13 may be not less than 500 nm but/or not more than 10 μm.

Referring again to FIGS. 1(*a*) to 1(*b*), at least the edge 13*c* of the conductive film 13 is covered with the protective material 15. In the present embodiment, the protective material 15 further covers the outer surrounding area of the second face 13*b* of the conductive film 13, but this is not essential to the present invention. The outer surrounding area of the second face 13*b* may be any region on the second face 13*b* adjacent to the edge 13*c*. In the illustrated aspect, the outer surrounding area is a region of the second face 13*b* excluding the sensing region A, but is not limited thereto.

The protective material 15 may contain, as functional groups, the polymer 16 having (i) C═O and (ii) at least one of OH and NH. Referring to FIGS. 2(*a*) and 2(*b*), these functional groups of the polymer 16 can bond to the MXene particles 10, and more particularly form hydrogen bonds with the modifier or terminal T (T is at least one selected from the group consisting of a hydroxyl group, a fluorine atom, a chlorine atom, an oxygen atom, and a hydrogen atom) of the MXene particles 10 (in FIG. 2(*a*), the polymer 16 that penetrates into the protective material 15 and the conductive film 13 from the protective material 15 is schematically shown by wavy lines, and in FIG. 2(*b*), hydrogen bonds are schematically shown by dotted lines). More specifically, with reference to Table 1, the acceptor of the functional group can form a hydrogen bond to a hydrogen donor of the modifier/terminal T, and the hydrogen donor of the functional group can form a hydrogen bond to the acceptor of the modifier/terminal T.

TABLE 1

| | Modifier/terminal T | Functional group |
|---|---|---|
| Hydrogen Donor | Hydroxyl group | OH |
| | Hydrogen atom | NH |
| Acceptor | Fluorine atom | C═O |
| | Chlorine atom | |
| | Oxygen atom | |

Although the MXene particles 10 are easily oxidized at the edge of the layer, the oxidation of the MXene particles 10 can be effectively suppressed (preferably prevented) by allowing the layer of the MXene particles 10 oriented in parallel to the surface 11*a* of the substrate 11 in the conductive film 13, covering at least the edge 13*c* of the conductive film 13 with the protective material 15 containing the polymer 16 having the functional group, and bonding (hydrogen bonding to modifier/terminal T) the functional group of the polymer 16 to the MXene particles 10 at least at the edge 13*c*. Such an effect of the protective material 15 may be understood as protection of the MXene particles 10 from oxidation. Although the present invention is not bound by any theory, it is considered that a component that is derived from air as a surrounding environment, a living body that can be a subject, or the like and that leads to oxidation of the MXene particles 10 (water, water vapor, oxygen, and the like) is likely to enter from the edge 13*c* of the conductive film 13 through the edge of the layer of the MXene particles 10, and oxidation can be started from the edge of the layer of the MXene particles 10. In the present embodiment, it is considered that the polymer 16 is strongly bonded (hydrogen-bonded) to the MXene particles 10, so that the component such as water, water vapor, oxygen, and the like can be effectively prevented from accessing the edge 13*c* of the conductive film 13.

Furthermore, the polymer 16 having a functional group capable of forming a hydrogen bond as described above can penetrate into the conductive film 13. More specifically, the polymer 16 can enter between the MXene particles 10 of the conductive film 13, and the functional group of the polymer 16 can be bonded (hydrogen-bonded to modifier/terminal T) to the MXene particles 10 inside the conductive film 13, thereby more effectively suppressing the oxidation of the MXene particles 10. (Note that a portion of the protective material 15 that does not penetrate the conductive film 13 may also be referred to as a protective film.)

The penetration of the polymer 16 into the interior of the conductive film 13 may be one or more depths of the MXene particles 10. Since the protective material 15 covers the edge 13*c*, a penetration depth dt in the thickness direction from the edge 13*c* may be equal to or more than the thickness of the MXene particles 10. When the protective material 15 further covers the outer surrounding area of the second face 13*b*, the penetration depth dp in the in-plane direction from the second face 13*b* may be equal to or larger than the in-plane dimension of the MXene particle 10.

Since the MXene particles 10 necessarily have at least one selected from the group consisting of a hydroxyl group, a fluorine atom, a chlorine atom, an oxygen atom, and a hydrogen atom as the modifier/terminal T, and thus necessarily have at least one of the modifier/terminal T that can be a hydrogen donor and the modifier/terminal T that can be a hydrogen acceptor as understood from Table 1, by selecting the polymer 16 having C═O as (i) a hydrogen acceptor and at least one of OH and NH as (ii) hydrogen donors as functional groups, it can be secured that the polymer 16 exhibits an interaction with the MXene particles 10, and a bonding force is generated between them. In many cases, the MXene particles 10 have both a modifier/terminal T (at least one of a hydroxyl group and a hydrogen atom) that can be a hydrogen donor and a modifier/terminal T (at least one selected from the group consisting of a fluorine atom, a chlorine atom, and an oxygen atom) that can be a hydrogen acceptor. In such a case, by selecting the polymer 16 having C═O as (i) a hydrogen acceptor and at least one of OH and NH as (ii) hydrogen donors as functional groups, the polymer 16 can exhibit strong interaction with the MXene particles 10, and a high bonding force is obtained between them. Since the ratio of the MXene particles 10 having an acceptor modifier/terminal T is high, by selecting the polymer 16 having at least one of OH and NH as a hydrogen donor in addition to C═O as a hydrogen acceptor, the polymer 16 exhibits a stronger interaction with the MXene particles 10, and a higher bonding force with respect to the MXene particles is obtained.

Specifically, the polymer 16 may be at least one selected from the group consisting of polyvinyl alcohol, a polyisocyanate-crosslinked acrylic resin, an epoxy-crosslinked acrylic resin, and polyamide-imide. As illustrated in Table 2, these polymers have a functional group capable of being bonded (hydrogen-bonded to modifier/terminal T) to the MXene particles, a high bonding force is obtained with respect to the MXene particles, the MXene particles can be firmly bound to each other, and the polymers are hardly peeled off from the conductive film 13. However, the polymers available in the present embodiment are not limited thereto.

TABLE 2

| Polymer | Functional group |
|---|---|
| Polyvinyl alcohol | OH, C═O |
| Polyisocyanate-crosslinked acrylic resin | NH, C═O |
| Epoxy-crosslinked acrylic resin | OH, C═O |
| Polyamide-imide | NH, C═O |

A method for covering a predetermined region (at least the edge 13*c* and if necessary, the outer surrounding area of the second face 13*a*) of the conductive film 13 with the protective material 15 is not particularly limited. For example, coating, bar coater, screen printing, and the like can be appropriately used.

If present, the lead 17 may be formed at any suitable timing as long as it is ultimately connected with the conductive film 13. For example, the lead 17 may be provided on the substrate 11 before the conductive film 13 is formed, and when the substrate 11 has a metal layer on the surface 11*a*, the lead wire may be integrally formed with the metal layer. For example, the lead 17 may be connected to a region (for example, by soldering) of the conductive film 13 that is not covered with the protective material 15 after a predetermined region of the conductive film 13 is covered with the protective material 15.

A sensing region A (and optionally one or more other regions, for example a region B (not shown) for connecting the lead 17) of the conductive film 13 is not covered with the protective material 15 and is exposed from the protective material 15.

The sensing region A is a region intended and/or designed to detect a biological signal. The sensing region A may have various modes as long as it is exposed from the protective material 15 and can detect a biological signal. The sensing region A may be in direct or indirect contact with a living body or biological tissue that may be a subject, and may be capable of directly or indirectly detecting a biological signal from the subject. A living body can be understood as a subject in a broad sense, and a biological tissue can be understood as a subject in a narrow sense. The biological tissue may form a part of a living body (for example, a human body), but may be separated from the living body.

More specifically, the biological tissue (measurement target) as the subject that emits the biological signal can be skin such as a human body, and can be blood vessels, muscles, brains, other organs, and the like under the skin. When the measurement target is a biological tissue (for example, skin) exposed to the outside, the sensing region A may be brought into contact with the biological tissue of the measurement target (directly or indirectly as described later) to directly detect (measure) the biological signal from the biological tissue of the measurement target. When the measurement target is a biological tissue under another biological tissue (for example, skin) exposed to the outside, the sensing region A may be brought into contact with the above another biological tissue (for example, skin) (directly or indirectly as described later) to indirectly detect (measure) the biological signal from the biological tissue of the measurement target.

As illustrated in FIGS. 1(*a*) and 1(*b*), the sensing region A may be exposed (exposed) to the external atmosphere of the biosignal sensing electrode 20. In this case, the sensing region A can be brought into direct contact with the living body or the biological tissue. Alternatively, in the sensing region A, the sensing region A may be covered with any appropriate other laminate (not shown). In this case, the sensing region A can be indirectly brought into contact with the living body or the biological tissue via the other laminate. The other laminate may be, for example, a conductive material layer, a gel or a film permeable to ions, or the like. The ion-permeable film may be a porous membrane. The porous membrane may be a membrane having a large number of fine pores and capable of selectively transmitting ions and molecules having a size smaller than a pore diameter. Such other laminates are not particularly limited and may be formed of organic materials, inorganic materials, or mixtures thereof. Polymers such as hydrophilic polymers as the organic materials, and ceramics as the inorganic materials, or a combination thereof can be exemplified. The thickness of the other laminates may be, for example, not less than 0.1 μm and not more than 300 μm. The porous membrane may have, for example, an average pore diameter of not less than 1 nm and not more than 1 μm. The porous membrane may be, for example, an aggregated particulate porous membrane, a network porous membrane, a fibrous porous membrane, a porous membrane having a plurality of isolated and/or communicating pipe holes, a porous membrane having a honeycomb structure, or the like, depending on the pore shape.

An area of the sensing region A is not particularly limited, but may be, for example, not less than 0.5 $mm^2$ and not more than 750 $mm^2$. When the area of the sensing region A is 0.5 $mm^2$ or more, (direct or indirect) contact with a living body or a biological tissue (for example, skin) that can be a subject is improved, and stable biological signal sensing can be performed. Since the area of the sensing region A is 750 $mm^2$ or less, it is possible to minimize the influence of motion artifacts due to the motion of the subject (for example, body motion) and to perform stable biological signal sensing. Preferably, the area of the sensing region A may be not less than 2 $mm^2$ and/or not more than 500 $mm^2$.

The sensing region A may be brought into direct or indirect contact with a living body or a biological tissue at least when sensing a biological signal. For example, the sensing region A (and another laminate when present) may be covered with a peelable protective seal (not shown), and the protective seal may be peeled off when the biosignal sensing electrode 20 senses the biological signal, and the sensing region A may be brought into direct or indirect contact with the living body or the biological tissue (via the other laminate).

According to the biosignal sensing electrode 20 of the present embodiment, by using the conductive film 13 containing the MXene particles 10, it is possible to effectively suppress oxidation of the MXene particles 10 in the conductive film 13 as described above while achieving relatively high conductivity (eventually, relatively low impedance), and thereby, it is possible to effectively reduce deterioration of the sensing capability over time. Specifically, the sensing capability can be interface impedance between the conductive film 13 and the living body or the biological tissue (for example, skin of a human body) in the sensing region A, and can be typically impedance of the conductive film measured by a three-electrode method. According to the present embodiment, a temporal change in the impedance of the conductive film 13 can be effectively reduced, and high stability can be obtained.

Although the biosignal sensing electrode according to one embodiment of the present invention has been described in detail above, the biosignal sensing electrode according to the above embodiment can be variously modified.

For example, as illustrated in FIGS. 4 and 5, biosignal sensing electrodes 21 and 23 may further include a cover 19. The cover 19 is located on the second face 13*b* of the conductive film 13, in which the sensing region A (and another laminate when present) is exposed from the cover 19.

More specifically, in one modification example, as in the biosignal sensing electrode 21 illustrated in FIG. 4, the sensing region A (and another laminate when present) which is a part of the second face 13*b* may be exposed from the protective material 15, and more specifically, the protective material 15 may cover the outer surrounding area of the second face 13*b* and exist between the conductive film 13 and the cover 19. In this case, the protective material 15 may serve a function of adhering the cover 19 to the conductive film 13 and a function of adhering the cover 19 to the substrate 11. Also in this example, the polymer derived from the protective material 15 can penetrate into the conductive film 13.

In another modification example, as in the biosignal sensing electrode 23 illustrated in FIG. 5, the entire second face 13*b* is exposed from the protective material 15, and the sensing region A (and another laminate when present) which is a part of the second face 13*b* is exposed from the cover 19. More specifically, the protective material 15 does not cover the outer surrounding area of the second face 13*b*, and may not exist between the conductive film 13 and the cover 19. In this case, the protective material 15 may serve a function of adhering the cover 19 to the substrate 11. Also in this example, the polymer derived from the protective material 15 can penetrate into the conductive film 13.

In any modification example, the adhering function may use a hydrogen bond, but is not limited thereto.

A size, a shape, and the like of the cover 19 can vary depending on the application of the biosignal sensing electrodes 21 and 23, and may be either flexible or rigid. The cover 19 may be formed of any suitable material, such as a polymer, metal, a semiconductor, ceramics, and the like. The cover 19 may be formed of one material or two or more materials.

The biosignal sensing electrode of the present invention is not limited to the above-described embodiments and modification examples. For example, referring to FIGS. 6(*a*) to 6(*b*), a biosignal sensing electrode 25 of another embodiment includes a substrate 11 and a conductive film 13 disposed on the substrate 11, a sensing region A (and another laminate when present) which is a part of a second face 13*b* may be exposed from a protective material 15, and more specifically, the protective material 15 may cover an edge 13*c* of the conductive film 13 and an outer surrounding area of the second face 13*b*. Furthermore, in the illustrated aspect, the cover 19 may be adhered to the edge 13*c* of the conductive film 13 and the outer surrounding area of the second face 13*b* via the protective material 15. In the biosignal sensing electrode 25, the substrate 11 may be conductive, and may be connected to or integrally molded with a conductive terminal portion 12. For example, the substrate 11 and the terminal portion 12 may be formed of metal. In the embodiment illustrated in FIGS. 6(*a*) and 6(*b*), the cover 19 is not essential, and the cover 19 may not be provided.

Figure 6A:
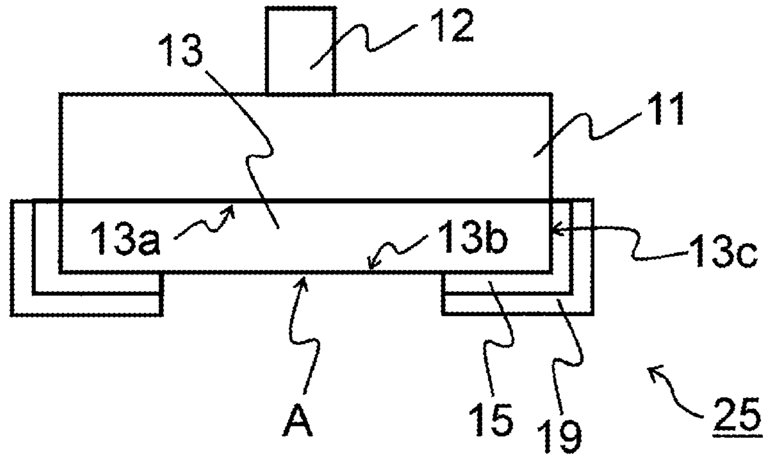
FIGS. 6(*a*) and 6(*b*) are diagrams for explaining a biosignal sensing electrode according to another embodiment of the present invention, in which FIG. 6(*a*) illustrates a schematic cross-sectional view of a biosignal sensing electrode, and FIG. 6(*b*) illustrates a schematic bottom view of FIG. 6(*a*).
Figure 6B:
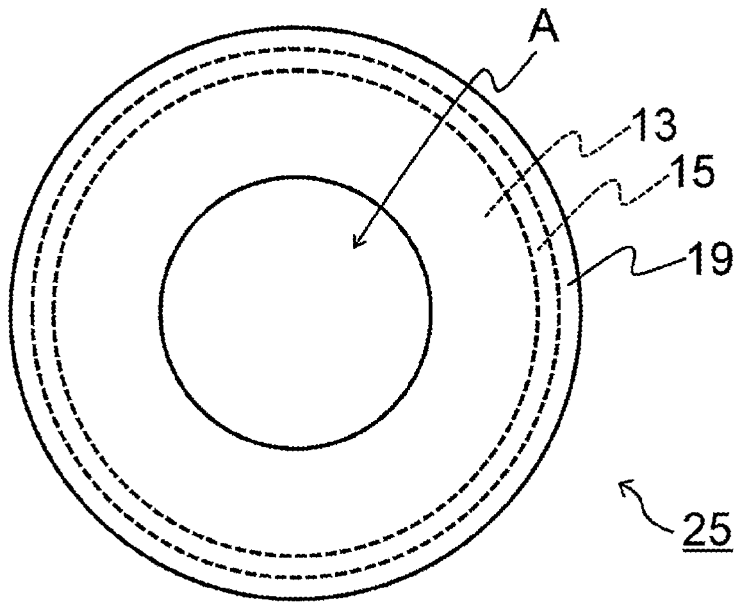

Note that, in the biosignal sensing electrode described with reference to FIGS. 4 to 6(*b*), the description regarding the biosignal sensing electrode described with reference to FIGS. 1(*a*) to 3(*b*) can be applied unless otherwise specified.

Examples

Biosignal sensing electrode samples having different polymers of the protective material were produced, and the stability of sensing capability thereof was evaluated. In addition, a cross section of the conductive film of each sample was analyzed.

Sample Production

A slurry in which the MXene particles were dispersed in water at a concentration of 10 mg/mL was prepared. The slurry prepared above was spray-coated on a gold-deposited slide glass (on a gold-deposited surface), and dried in a vacuum oven (350 mm Torr) at 70° C. overnight to form a conductive film of MXene particles on the gold-deposited slide glass. Thereafter, a protective material-containing liquid (described later) was adhered to the edge of the conductive film and a predetermined region on the upper surface of the conductive film (a region excluding the sensing region A and the region B for connecting the lead) by screen printing. Thereafter, a corresponding polymer film (an opening corresponding to the sensing region A and an opening corresponding to the region B for connecting the lead) was disposed on the predetermined region, and dried in an oven at 70° C. for 5 hours. Thereafter, a lead (for evaluation) including a lead wire was soldered to the conductive film in the region B. The soldered portion was coated with Kapton tape to seal the region B from the ambient atmosphere. Thus, a biosignal sensing electrode sample was produced.

As a protective material-containing liquid (a liquid material containing a raw material of a protective material), a liquid material in which each polymer shown in Table 3 was dispersed in a solvent (for example, water in a case of polyvinyl alcohol) was used in Examples 1 to 4 and Comparative Examples 1 to 4. biosignal sensing electrode samples having different polymers of protective materials were produced under the same conditions as in Examples 1 to 4 and Comparative Examples 1 to 4 except that different protective material-containing liquids were used.

Evaluation of Stability of Sensing Capability (Impedance)

Each sample was immersed in phosphate buffered saline (PBS: Quality Biological, pH 7.4) in a beaker, and the impedance of the conductive film was measured every 4 hours. The temperature of the phosphate buffered saline and the impedance measurement was room temperature. The impedance measurement was performed using a potentiostat manufactured by AUTOLAB under the condition of 10 Hz by a three-electrode method using a sample as a working electrode (more specifically, a conductive film on a gold-deposited film is used as a working electrode via a lead wire), platinum as a counter electrode, and a silver/silver chloride electrode as a reference electrode (what is measured by this is the impedance between the reference electrode and the working electrode). The measured values before immersion, after immersion for 12 hours, and after immersion for 24 hours are also shown in Table 3.

Referring to Table 3, in Examples 1 to 4 (Polymer: polyvinyl alcohol, polyisocyanate-crosslinked acrylic resin, epoxy-crosslinked acrylic resin, polyamide-imide), a temporal change in the measured value of impedance was almost observed even after immersion for 24 hours, and high stability was exhibited. On the other hand, in Comparative Examples 1 to 4 (Polymer: polyethylene, polypropylene, fluorine-based resin, ethylene-vinyl acetate copolymer resin), the temporal change in the measured value of impedance was observed after immersion for 12 hours, and the stability was poor.

TABLE 3

| | | Impedance [Ω] | | | Cross section analysis |
|---|---|---|---|---|---|
| | Polymer | Before immersion | After 12 hours | After 24 hours | (polymer detection) |
| Example 1 | Polyvinyl alcohol | 100 | 102 | 101 | Detected |
| Example 2 | Polyisocyanate-crosslinked acrylic resin | 107 | 107 | 105 | Detected |
| Example 3 | Epoxy-crosslinked acrylic resin | 98 | 101 | 105 | Detected |
| Example 4 | Polyamide-imide | 100 | 98 | 107 | Detected |
| Comparative Example 1 | Polypropylene | 102 | 264 | 1100 | Not Detected |
| Comparative Example 2 | Polyethylene | 101 | 298 | 1021 | Not Detected |
| Comparative Example 3 | Fluorine resin | 100 | 278 | 1012 | Not Detected |
| Comparative Example 4 | Ethylene-vinyl acetate copolymer resin | 98 | 301 | 1008 | Not Detected |

Cross Section Analysis of Conductive Film

The conductive film was cut, and a cross section exposed thereby was analyzed by infrared spectroscopy (IR) to examine whether or not a polymer was detected. The results are also shown in Table 3. Examples 1 to 4 (Polymer: polyvinyl alcohol, polyisocyanate-crosslinked acrylic resin, epoxy-crosslinked acrylic resin, polyamide-imide), a polymer was detected inside the conductive film. On the other hand, in Comparative Examples 1 to 4 (Polymer: polyethylene, polypropylene, fluorine-based resin, ethylene-vinyl acetate copolymer resin), no polymer was detected inside the conductive film.

From the above results, it is considered that the polymers of Examples 1 to 4 have C═O and at least one of OH and NH as functional groups, and can penetrate into the conductive film, and the functional groups of the polymer can be bonded (hydrogen-bonded to modifier/terminal T) to the MXene particles, so that the MXene particles can be strongly bonded to each other, ingress of water or the like derived from physiological saline from the edge of the conductive film can be prevented, and oxidation of the MXene particles can be effectively reduced. As a result, a temporal change in impedance can be prevented, and high stability can be obtained. On the other hand, it is considered that the polymer of Comparative Examples 1 to 4 did not have C═O and at least one of OH and NH as functional groups, and the above effect was not obtained.

The biosignal sensing electrode of the present invention can be used for any appropriate application, and can be used in a state where a sensing region of the conductive film is brought into direct or indirect contact with a living body or a biological tissue (for example, skin of a human body) that can be a subject in order to sense a biological signal, but is not limited thereto.

REFERENCE SIGNS LIST

1*a*, 1*b* Layer body ($M_mX_n$ layer)
3*a*, 5*a*, 3*b*, 5*b* Modifier or terminal T
7*a*, 7*b* MXene layer
10, 10*a*, 10*b* MXene (layered material) particles
11 Substrate
12 Terminal portion
13 Conductive film
13*a* First face
13*b* Second face
13*c* Edge
15 Protective material
16 Polymer
17 Lead
19 Cover
20, 21, 23, 25 biosignal sensing electrode
A Sensing region
dp Penetration depth in in-plane direction
dt Penetration depth in thickness direction

The invention claimed is:

1. A biosignal sensing electrode, comprising
- a substrate;
- a conductive film on the substrate and having a first face on a side thereof facing the substrate, a second face on a side thereof opposite to the substrate, and an edge connecting the first face and the second face, wherein the conductive film comprises particles of a layered material comprising one or plural layers, the one or plural layers being oriented parallel to a surface of the substrate and comprising a layer body represented by: $M_mX_n$
  - wherein M is at least one metal of Group 3, 4, 5, 6, or 7, X is a carbon atom, a nitrogen atom, or a combination thereof, n is not less than 1 and not more than 4, and m is more than n but not more than 5, and
  - a modifier or terminal T existing on a surface of the layer body, wherein T is at least one selected from the group consisting of a hydroxyl group, a fluorine atom, a chlorine atom, an oxygen atom, and a hydrogen atom; and
- a protective material comprising a polymer having C═O and at least one of OH and NH as a functional group covering at least the edge of the conductive film, the functional group being bonded to the particles of the layered material, and at least a part of the second face of the conductive film is exposed from the protective material,
- wherein the protective material covers and is in direct contact with at least the edge of the conductive film and a part of the second face of the conductive film.

2. The biosignal sensing electrode according to claim 1, wherein the polymer penetrates into the conductive film.

3. The biosignal sensing electrode according to claim 2, wherein the polymer comprises at least one selected from the group consisting of polyvinyl alcohol, polyisocyanate-crosslinked acrylic resin, epoxy-crosslinked acrylic resin, and polyamide-imide.

4. The biosignal sensing electrode according to claim 1, wherein the polymer comprises at least one selected from the group consisting of polyvinyl alcohol, polyisocyanate-crosslinked acrylic resin, epoxy-crosslinked acrylic resin, and polyamide-imide.

5. The biosignal sensing electrode according to claim 1, wherein the protective material further covers an outer surrounding area of the second face of the conductive film.

6. The biosignal sensing electrode according to claim 5, wherein the outer surrounding area is a region of the second face excluding the part of the second face of the conductive film that is exposed from the protective material.

7. The biosignal sensing electrode according to claim 1, further comprising a cover on the second face of the conductive film, wherein a part of the second face is exposed from the cover.

8. The biosignal sensing electrode according to claim 7, wherein the protective material is between the conductive film and the cover.

9. The biosignal sensing electrode according to claim 1, wherein the $M_mX_n$ is at least one selected from the group consisting of $Ti_2C$, $Ti_3C_2$, $Ti_3(CN)$, $(Cr_2Ti)C_2$, $(Mo_2Ti)C_2$, $(MO_2Ti_2)C_3$, and $(Mo_{2.7}V_{1.3})C_3$.

10. The biosignal sensing electrode according to claim 1, wherein the substrate is conductive.

11. The biosignal sensing electrode according to claim 1, further comprising a lead connected to the conductive film.

12. The biosignal sensing electrode according to claim 1, wherein the surface of the substrate is in contact with the first face of the conductive film.

13. The biosignal sensing electrode according to claim 1, wherein a thickness of the conductive film is not less than 200 nm and not more than 20 μm.

14. The biosignal sensing electrode according to claim 1, wherein the at least the part of the second face of the conductive film that is exposed from the protective material has an area of not less than 0.5 $mm^2$ and not more than 750 $mm^2$.

* * * * *